United States Patent
Wan

(10) Patent No.: US 12,254,141 B2
(45) Date of Patent: *Mar. 18, 2025

(54) UNFUSED POSE-BASED DRIFT CORRECTION OF A FUSED POSE OF A TOTEM IN A USER INTERACTION SYSTEM

(71) Applicant: Magic Leap, Inc., Plantation, FL (US)

(72) Inventor: Sheng Wan, San Jose, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/597,716

(22) Filed: Mar. 6, 2024

(65) Prior Publication Data

US 2024/0264680 A1 Aug. 8, 2024

Related U.S. Application Data

(63) Continuation of application No. 18/165,715, filed on Feb. 7, 2023, now Pat. No. 11,960,661, which is a
(Continued)

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/012* (2013.01); *G06F 3/0304* (2013.01); *G06T 7/70* (2017.01);
(Continued)

(58) Field of Classification Search
CPC ...... G06F 3/0346; G06F 3/012; G06F 3/0304; G09G 5/38; G09G 2304/0464; G09G 2354/00; G06T 7/70
See application file for complete search history.

(56) References Cited

U.S. PATENT DOCUMENTS

| 4,344,092 A | 8/1982 | Miller |
| 4,652,930 A | 3/1987 | Crawford |

(Continued)

FOREIGN PATENT DOCUMENTS

| CN | 100416340 C | 9/2008 |
| CN | 101449270 A | 6/2009 |

(Continued)

OTHER PUBLICATIONS

"Extended European Search Report issued on Aug. 6, 2024", European Patent Application No. 24184599.9, (14 pages).
(Continued)

*Primary Examiner* — Robert J Michaud
(74) *Attorney, Agent, or Firm* — Stephen M. De Klerk

(57) ABSTRACT

The invention relates generally to a user interaction system having a head unit for a user to wear and a totem that the user holds in their hand and determines the location of a virtual object that is seen by the user. A fusion routine generates a fused location of the totem in a world frame based on a combination of an EM wave and a totem IMU data. The fused pose may drift over time due to the sensor's model mismatch. An unfused pose determination modeler routinely establishes an unfused pose of the totem relative to the world frame. A drift is declared when a difference between the fused pose and the unfused pose is more than a predetermined maximum distance.

17 Claims, 8 Drawing Sheets

Related U.S. Application Data continuation of application No. 17/518,148, filed on Nov. 3, 2021, now Pat. No. 11,609,645, which is a continuation of application No. 17/002,663, filed on Aug. 25, 2020, now Pat. No. 11,216,086, which is a continuation of application No. 16/523,779, filed on Jul. 26, 2019, now Pat. No. 10,795,458.

(60) Provisional application No. 62/818,032, filed on Mar. 13, 2019, provisional application No. 62/714,609, filed on Aug. 3, 2018.

(51) Int. Cl.
*G06F 3/03* (2006.01)
*G06T 7/70* (2017.01)
*G09G 5/38* (2006.01)

(52) U.S. Cl.
CPC ....... *G09G 5/38* (2013.01); *G09G 2340/0464* (2013.01); *G09G 2354/00* (2013.01)

(56) References Cited

U.S. PATENT DOCUMENTS

| | | |
|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,659,701 A | 8/1997 | Amit et al. |
| 5,682,255 A | 10/1997 | Friesem et al. |
| 5,689,669 A | 11/1997 | Lynch |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,002,853 A | 12/1999 | de Hond |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,079,982 A | 6/2000 | Meader |
| 6,117,923 A | 9/2000 | Amagai et al. |
| 6,119,147 A | 9/2000 | Toomey et al. |
| 6,124,977 A | 9/2000 | Takahashi |
| 6,179,619 B1 | 1/2001 | Tanaka |
| 6,191,809 B1 | 2/2001 | Hori et al. |
| 6,219,045 B1 | 4/2001 | Leahy et al. |
| 6,243,091 B1 | 6/2001 | Berstis |
| 6,271,843 B1 | 8/2001 | Lection et al. |
| 6,362,817 B1 | 3/2002 | Powers et al. |
| 6,375,369 B1 | 4/2002 | Schneider et al. |
| 6,385,735 B1 | 5/2002 | Wilson |
| 6,396,522 B1 | 5/2002 | Vu |
| 6,414,679 B1 | 7/2002 | Miodonski et al. |
| 6,538,655 B1 | 3/2003 | Kubota |
| 6,541,736 B1 | 4/2003 | Huang et al. |
| 6,570,563 B1 | 5/2003 | Honda |
| 6,573,903 B2 | 6/2003 | Gantt |
| 6,590,593 B1 | 7/2003 | Robertson et al. |
| 6,621,508 B1 | 9/2003 | Shiraishi et al. |
| 6,690,393 B2 | 2/2004 | Heron et al. |
| 6,757,068 B2 | 6/2004 | Foxlin |
| 6,784,901 B1 | 8/2004 | Harvfey et al. |
| 6,961,055 B2 | 11/2005 | Doak |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,211,986 B1 | 5/2007 | Flowerdew et al. |
| 7,219,245 B1 | 5/2007 | Raghuvanshi |
| 7,382,288 B1 | 6/2008 | Wilson |
| 7,414,629 B2 | 8/2008 | Santodomingo |
| 7,431,453 B2 | 10/2008 | Hogan |
| 7,467,356 B2 | 12/2008 | Gettman et al. |
| 7,542,040 B2 | 6/2009 | Templeman |
| 7,573,640 B2 | 8/2009 | Nivon et al. |
| 7,653,877 B2 | 1/2010 | Matsuda |
| 7,663,625 B2 | 2/2010 | Chartier et al. |
| 7,724,980 B1 | 5/2010 | Shenzhi |
| 7,746,343 B1 | 6/2010 | Charaniya et al. |
| 7,751,662 B2 | 7/2010 | Kleemann |
| 7,758,185 B2 | 7/2010 | Lewis |
| 7,788,323 B2 | 8/2010 | Greenstein et al. |
| 7,804,507 B2 | 9/2010 | Yang et al. |
| 7,814,429 B2 | 10/2010 | Buffet et al. |
| 7,817,150 B2 | 10/2010 | Reichard et al. |
| 7,844,724 B2 | 11/2010 | Van Wie et al. |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,360,578 B2 | 1/2013 | Nummela et al. |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,285,872 B1 | 3/2016 | Raffle et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B1 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,646,283 B2 | 5/2020 | Johnson et al. |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |

(56) References Cited

U.S. PATENT DOCUMENTS

| | | |
|---|---|---|
| 11,209,656 B1 | 12/2021 | Choi et al. |
| 11,236,993 B1 | 2/2022 | Hall et al. |
| 2001/0010598 A1 | 8/2001 | Aritake et al. |
| 2001/0018667 A1 | 8/2001 | Kim |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1 | 7/2002 | Matsuda |
| 2002/0113820 A1 | 8/2002 | Robinson et al. |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0080976 A1 | 5/2003 | Satoh et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1 | 6/2004 | Pair et al. |
| 2004/0174496 A1 | 9/2004 | Ji et al. |
| 2004/0186902 A1 | 9/2004 | Stewart |
| 2004/0193441 A1 | 9/2004 | Altieri |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1 | 5/2005 | Okamoto et al. |
| 2005/0128212 A1 | 6/2005 | Edecker et al. |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0185398 A1 | 8/2007 | Kimura et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1 | 2/2008 | Hailpern |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0125218 A1 | 5/2008 | Collins |
| 2008/0146942 A1 | 6/2008 | Dala-Krishna |
| 2008/0173036 A1 | 7/2008 | Williams |
| 2008/0177506 A1 | 7/2008 | Kim |
| 2008/0183190 A1 | 7/2008 | Adcox et al. |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1 | 9/2008 | Sawada et al. |
| 2008/0246693 A1 | 10/2008 | Hailpern et al. |
| 2008/0316768 A1 | 12/2008 | Travis |
| 2009/0076791 A1 | 3/2009 | Rhoades et al. |
| 2009/0091583 A1 | 4/2009 | McCoy |
| 2009/0153797 A1 | 6/2009 | Allon et al. |
| 2009/0177445 A1 | 7/2009 | Capps, Jr. et al. |
| 2009/0224416 A1 | 9/2009 | Laakkonen et al. |
| 2009/0245730 A1 | 10/2009 | Kleemann |
| 2009/0287728 A1 | 11/2009 | Martine et al. |
| 2009/0300528 A1 | 12/2009 | Stambaugh |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0060970 A1 | 3/2010 | Harris et al. |
| 2010/0063854 A1 | 3/2010 | Purvis et al. |
| 2010/0070378 A1 | 3/2010 | Trotman et al. |
| 2010/0079841 A1 | 4/2010 | Levola |
| 2010/0115428 A1 | 5/2010 | Shuping et al. |
| 2010/0153934 A1 | 6/2010 | Lachner |
| 2010/0194632 A1 | 8/2010 | Raento et al. |
| 2010/0205541 A1 | 8/2010 | Rappaport et al. |
| 2010/0214284 A1 | 8/2010 | Rieffel et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1 | 10/2010 | Carlson et al. |
| 2010/0274627 A1 | 10/2010 | Carlson |
| 2010/0277803 A1 | 11/2010 | Pockett et al. |
| 2010/0284085 A1 | 11/2010 | Laakkonen |
| 2010/0287485 A1 | 11/2010 | Bertolami et al. |
| 2010/0296163 A1 | 11/2010 | Sarikko |
| 2010/0306715 A1 | 12/2010 | Geisner et al. |
| 2010/0309687 A1 | 12/2010 | Sampsell et al. |
| 2011/0010636 A1 | 1/2011 | Hamilton, II et al. |
| 2011/0021263 A1 | 1/2011 | Anderson et al. |
| 2011/0022870 A1 | 1/2011 | Mcgrane |
| 2011/0041083 A1 | 2/2011 | Gabai et al. |
| 2011/0050640 A1 | 3/2011 | Lundback et al. |
| 2011/0050655 A1 | 3/2011 | Mukawa |
| 2011/0064268 A1 | 3/2011 | Cobb et al. |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |

(56) References Cited

U.S. PATENT DOCUMENTS

| | | |
|---|---|---|
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0123015 A1 | 5/2014 | Sako et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0204438 A1 | 7/2014 | Yamada et al. |
| 2014/0244983 A1 | 8/2014 | McDonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0292645 A1 | 10/2014 | Tsurumi et al. |
| 2014/0313228 A1 | 10/2014 | Kasahara |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vasquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0163063 A1 | 6/2016 | Ashman |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0172409 A1 | 6/2017 | Cavin et al. |
| 2017/0185261 A1 | 6/2017 | Perez et al. |
| 2017/0192239 A1 | 7/2017 | Nakamura et al. |
| 2017/0201709 A1 | 7/2017 | Igarashi et al. |
| 2017/0205903 A1* | 7/2017 | Miller .................. G06T 7/174 |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Lin et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0336867 A1 | 11/2017 | Wilairat et al. |
| 2017/0357332 A1* | 12/2017 | Balan .................. G06F 3/017 |
| 2017/0363985 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |

(56) References Cited

U.S. PATENT DOCUMENTS

| | | |
|---|---|---|
| 2018/0056305 A1 | 3/2018 | Sankey et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0101214 A1 | 4/2018 | Mahindru et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0196084 A1 | 7/2018 | Tustaniwskyj |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1* | 6/2019 | Hare ............... G06T 7/70 |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158023 A1 | 5/2021 | Fu et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |

FOREIGN PATENT DOCUMENTS

| | | |
|---|---|---|
| CN | 102448566 A | 5/2012 |
| CN | 103460255 A | 12/2013 |
| CN | 104040410 A | 9/2014 |
| CN | 104603675 A | 5/2015 |
| CN | 105938426 A | 9/2016 |
| CN | 106662754 A | 5/2017 |
| CN | 107004303 A | 8/2017 |
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | H03-036974 U | 4/1991 |
| JP | H10-333094 A | 12/1998 |
| JP | 2002-015222 A | 1/2002 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2010-139575 | 6/2010 |
| JP | 2010-146030 A | 7/2010 |
| JP | 2011-033993 A | 2/2011 |
| JP | 2011-257203 A | 12/2011 |
| JP | 2011-530131 A | 12/2011 |
| JP | 2012-015774 A | 1/2012 |
| JP | 2012-088777 A | 5/2012 |
| JP | 2012-235036 A | 11/2012 |
| JP | 2013-525872 A1 | 6/2013 |
| JP | 2013-206322 A | 10/2013 |
| JP | 2014-500522 A | 1/2014 |
| JP | 2014-90386 A | 5/2014 |
| JP | 2014-174366 A | 9/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2016-126134 A | 7/2016 |

(56) References Cited

FOREIGN PATENT DOCUMENTS

| | | |
|---|---|---|
| JP | 2017-015697 A | 1/2017 |
| JP | 2017-1084444 A | 6/2017 |
| JP | 2017-153498 | 9/2017 |
| JP | 2017-531840 A | 10/2017 |
| JP | 2017-535825 A | 11/2017 |
| JP | 6232763 B2 | 11/2017 |
| JP | 2018-503165 A | 2/2018 |
| JP | 6333965 B2 | 5/2018 |
| JP | 2018-173739 A | 11/2018 |
| JP | 2019-177134 A | 10/2019 |
| KR | 2005-0010775 A | 1/2005 |
| KR | 10-2006-0059992 A | 6/2006 |
| KR | 10-2011-0006408 | 1/2011 |
| KR | 10-1372623 B1 | 3/2014 |
| KR | 10-2017-0017243 | 2/2017 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007037089 A1 | 4/2007 |
| WO | 2007041678 A2 | 4/2007 |
| WO | 2007/085628 A1 | 8/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2010015807 A1 | 2/2010 |
| WO | 2014203440 A1 | 12/2010 |
| WO | 2012030787 A2 | 3/2012 |
| WO | 2013/049012 A1 | 4/2013 |
| WO | 2013062701 A1 | 5/2013 |
| WO | 2013/145536 A1 | 10/2013 |
| WO | 2014033306 A1 | 3/2014 |
| WO | 2015/079610 A1 | 6/2015 |
| WO | 2015/143641 A1 | 10/2015 |
| WO | 2015194597 A1 | 12/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017051595 A1 | 3/2017 |
| WO | 2017120475 A1 | 7/2017 |
| WO | 2017176861 A1 | 10/2017 |
| WO | 2017203201 A1 | 11/2017 |
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018/166921 A | 9/2018 |
| WO | 2018166921 A1 | 9/2018 |
| WO | 2018236587 A1 | 12/2018 |
| WO | 2019040493 A1 | 2/2019 |
| WO | 2019148154 A1 | 8/2019 |
| WO | 2020010226 A1 | 1/2020 |

OTHER PUBLICATIONS

"Extended European Search Report issued on Jul. 9, 2024", European Patent Application No. 24166847.4, (8 pages).
"First Office Action mailed Jun. 20, 2024 with English translation", Japanese Patent Application No. 2021-564496, (14 pages).
"First Office Action mailed Jun. 24, 2024 with English translation", Japanese Patent Application No. 2022-504602, (7 pages).
"Non Final Office Action mailed on Jun. 17, 2024", U.S. Appl. No. 18/348,732, (19 pages).
"Communication Pursuant to Article 94(3) EPC mailed on Feb. 21, 2024", European Patent Application No. 20770244.0, (8 pages).
"Communication Pursuant to Article 94(3) EPC mailed on Oct. 6, 2023", European Patent Application No. 19851373.1, (6 pages).
"Extended European Search Report issued on Jan. 8, 2024", European Patent Application No. 23195266.4, (8 pages).
"Extended European Search Report issued on Apr. 25, 2024", European Patent Application No. 23208907.8, (9 pages).
"Final Office Action mailed Oct. 16, 2023", U.S. Appl. No. 17/098,043, (7 pages).
"Final Office Action mailed on Dec. 1, 2023", U.S. Appl. No. 17/357,795, (18 pages).
"Final Office Action mailed on May 24, 2024", United States U.S. Appl. No. 18/046,739, (52 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"First Office Action mailed Mar. 1, 2024 with English translation", Japanese Patent Application No. 2021-553297, (5 pages).
"First Office Action mailed Nov. 2, 2023 with English translation", Chinese Patent Application No. 201980090867.1, (16 pages).
"First Office Action mailed on Dec. 11, 2023 with translation", Chinese Patent Application No. 201980032005.3, (17 pages).
"First Office Action mailed on Dec. 25, 2023 with English translation", Chinese Patent Application No. 2019800046303.8, (13 pages).
"First Office Action mailed on Feb. 1, 2024 with English translation", Chinese Patent Application No. 202080018865.4, (9 pages).
"First Office Action mailed on Mar. 25, 2024 with English translation", Chinese Patent Application No. 202080018919.7, (21 pages).
"Non Final Office Action mailed on Feb. 26, 2024", U.S. Appl. No. 18/046,739, (48 pages).
"Non Final Office Action mailed on May 16, 2024", U.S. Appl. No. 18/361,546, (11 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Non Final Office Action mailed on Oct. 11, 2023", U.S. Appl. No. 17/357,795, (14 pages).
"Non Final Office Action mailed on Oct. 24, 2023", U.S. Appl. No. 17/259,020, (21 pages).
"Office Action mailed Nov. 21, 2023 with English Translation", Japanese Patent Application No. 2021-535716, (15 pages).
"Office Action mailed on Dec. 14, 2023 with English translation", Japanese Patent Application No. 2021-526564, (13 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Mar. 6, 2024 with English translation", Chinese Patent Application No. 201980053016.X, (7 pages).
"Office Action mailed on Nov. 7, 2023 with English translation", Korean Patent Application No. 10-2023-7036734, (5 pages).
"Office Action mailed on Nov. 8, 2023 with English translation", Chinese Patent Application No. 201980060018.1, (12 pages).
"Penultimate Office Action mailed on Oct. 19, 2023 with English translation", Japanese Patent Application No. 2021-509779, (5 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Feb. 28, 2023", European Patent Application No. 19845418.3, (6 Pages).

(56) References Cited

OTHER PUBLICATIONS

"Communication Pursuant to Article 94(3) EPC mailed on Jan. 4, 2022", European Patent Application No. 20154070.5, (8 pages).
"Communication Pursuant to Article 94(3) EPC mailed on Jul. 28, 2023", European Patent Application No. 19843487.0, (15 pages).
"Communication Pursuant to Article 94(3) EPC mailed on May 23, 2023", European Patent Application No. 18890390.0, (5 pages).
"Communication Pursuant to Article 94(3) EPC mailed on May 30, 2022", European Patent Application No. 19768418.6, (6 pages).
"Communication Pursuant to Article 94(3) EPC mailed on Oct. 21, 2021", European Patent Application No. 16207441.3, (4 pages).
"Communication Pursuant to Rule 164(1) EPC mailed on Feb. 23, 2022", European Patent Application No. 20753144.3, (11 pages).
"Communication Pursuant to Rule 164(1) EPC mailed on Jul. 27, 2021", European Patent Application No. 19833664.6, (11 pages).
"Decision of Rejection mailed on Jan. 5, 2023 with English translation", Chinese Patent Application No. 201880079474.6, (10 pages).
"European Search Report mailed on Oct. 15, 2020", European Patent Application No. 20180623.9, (10 pages).
"Extended European Search Report issued on Apr. 5, 2023", European Patent Application No. 20888716.6, (11 pages).
"Extended European Search Report issued on Dec. 14, 2022", European Patent Application No. 20886547.7, (8 pages).
"Extended European Search Report issued on Jul. 20, 2022", European Patent Application No. 19885958.9, (9 pages).
"Extended European Search Report issued on May 20, 2020", European Patent Application No. 20154070.5, (7 pages).
"Extended European Search Report issued on Jan. 22, 2021", European Patent Application No. 18890390.0, (11 pages).
"Extended European Search Report issued on Nov. 3, 2020", European Patent Application No. 18885707.2, (7 pages).
"Extended European Search Report issued on Jun. 30, 2021", European Patent Application No. 19811971.1, (9 pages).
"Extended European Search Report issued on Mar. 4, 2021", European Patent Application No. 19768418.6, (9 pages).
"Extended European Search Report issued on Nov. 4, 2020", European Patent Application No. 20190980.1, (14 pages).
"Extended European Search Report issued on Aug. 24, 2022", European Patent Application No. 20846338.0, (13 pages).
"Extended European Search Report issued on Aug. 8, 2022", European Patent Application No. 19898874.3, (8 pages).
"Extended European Search Report issued on Sep. 8, 2022", European Patent Application No. 20798769.4, (13 pages).
"Extended European Search Report mailed on Nov. 3, 2022", European Patent Application No. 20770244.0, (23 pages).
"Extended European Search Report mailed on Jun. 12, 2017", European Patent Application No. 16207441.3, (8 pages).
"Extended European Search Report mailed on Jan. 28, 2022", European Patent Application No. 19815876.8, (9 pages).
"Extended European Search Report mailed on Jan. 4, 2022", European Patent Application No. 19815085.6, (9 pages).
"Extended European Search Report mailed on Jul. 16, 2021", European Patent Application No. 19810142.0, (14 pages).
"Extended European Search Report mailed on Jul. 30, 2021", European Patent Application No. 19839970.1, (7 pages).
"Extended European Search Report mailed on Jun. 19, 2020", European Patent Application No. 20154750.2, (10 pages).
"Extended European Search Report mailed on Mar. 22, 2022", European Patent Application No. 19843487.0, (14 pages).
"Extended European Search Report mailed on May 16, 2022", European Patent Application No. 19871001.4, (9 pages).
"Extended European Search Report mailed on May 30, 2022", European Patent Application No. 20753144.3, (10 pages).
"Extended European Search Report mailed on Oct. 27, 2021", European Patent Application No. 19833664.6, (10 pages).
"Extended European Search Report mailed on Sep. 20, 2021", European Patent Application No. 19851373.1, (8 pages).
"Extended European Search Report mailed on Sep. 28, 2021", European Patent Application No. 19845418.3, (13 pages).

"Final Office Action mailed on Aug. 10, 2020", U.S. Appl. No. 16/225,961, (13 pages).
"Final Office Action mailed on Dec. 29, 2022", U.S. Appl. No. 17/098,059, (32 pages).
"Final Office Action mailed on Dec. 4, 2019", U.S. Appl. No. 15/564,517, (15 pages).
"Final Office Action mailed on Feb. 19, 2020", U.S. Appl. No. 15/552,897, (17 pages).
"Final Office Action mailed on Feb. 23, 2022", U.S. Appl. No. 16/748,193, (23 pages).
"Final Office Action mailed on Feb. 3, 2022", U.S. Appl. No. 16/864,721, (36 pages).
"Final Office Action mailed on Jul. 13, 2022", U.S. Appl. No. 17/262,991, (18 pages).
"Final Office Action mailed on Jun. 15, 2021", U.S. Appl. No. 16/928,313, (42 pages).
"Final Office Action mailed on Mar. 1, 2021", U.S. Appl. No. 16/214,575, (29 pages).
"Final Office Action mailed on Mar. 10, 2023", U.S. Appl. No. 17/357,795, (15 pages).
"Final Office Action mailed on Mar. 19, 2021", U.S. Appl. No. 16/530,776, (25 pages).
"Final Office Action mailed on Nov. 24, 2020", U.S. Appl. No. 16/435,933, (44 pages).
"Final Office Action mailed on Sep. 17, 2021", U.S. Appl. No. 16/938,782, (44 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Examination Report Mailed on Dec. 8, 2022", Australian Patent Application No. 2018392482, (3 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"First Examination Report Mailed on May 13, 2022", Indian Patent Application No. 202047026359, (8 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed on Apr. 13, 2023 with English Translation", Japanese Patent Application No. 2020-567766, (7 pages).
"First Office Action mailed on Dec. 22, 2022 with English translation", Chinese Patent Application No. 201980061450.2, (11 pages).
"First Office Action mailed on Feb. 11, 2022 with English translation", Chinese Patent Application No. 201880089255.6, (17 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Jun. 13, 2023 with English translation", Japanese Patent Application No. 2020-567853, (7 pages).
"First Office Action mailed on Mar. 14, 2022 with English translation", Chinese Patent Application No. 201880079474.6, (11 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"First Office Action mailed on May 26, 2023 with English translation", Japanese Patent Application No. 2021-500607, (6 pages).
"First Office Action mailed on May 30, 2023", Israeli Patent Application No. 275065, (4 pages).
"First Office Action mailed on May 30, 2023 with English translation", Japanese Patent Application No. 2021-519873, (8 pages).
"First Office Action mailed on Sep. 16, 2022 with English translation", Chinese Patent Application No. 201980063642.7, (7 pages).
"First Office Action mailed Sep. 29, 2023 with English translation", Japanese Patent Application No. 2023-10887, (5 pages).
"FS_XR5G: Permanent document, v0.4.0", Qualcomm Incorporated, 3GPP TSG-SA 4 Meeting 103 retrieved from the Internet:

(56) References Cited

OTHER PUBLICATIONS

URL:http://www.3gpp.org/ftp/Meetings%5F3GPP%5FSYNC/SA4/ Docs/S4%2DI90526%2Ezip [retrieved on Apr. 12, 2019], Apr. 12, 2019, (98 pages).
"International Search Report and Written Opinion mailed on Feb. 12, 2021", International PCT Application No. PCT/US20/60555, (25 pages).
"International Search Report and Written Opinion mailed on Mar. 12, 2020", International PCT Patent Application No. PCT/US19/67919, (14 pages).
"International Search Report and Written Opinion mailed on Aug. 15, 2019", International PCT Patent Application No. PCT/US19/33987, (20 pages).
"International Search Report and Written Opinion mailed on Jun. 15, 2020", International PCT Patent Application No. PCT/US2020/017023, (13 pages).
"International Search Report and Written Opinion mailed on Oct. 16, 2019", International PCT Patent Application No. PCT/US19/43097, (10 pages).
"International Search Report and Written Opinion mailed on Oct. 16, 2019", International PCT Patent Application No. PCT/US19/36275, (10 pages).
"International Search Report and Written Opinion mailed on Oct. 16, 2019", International PCT Patent Application No. PCT/US19/43099, (9 pages).
"International Search Report and Written Opinion mailed on Jun. 17, 2016", International PCT Patent Application No. PCT/FI2016/050172, (9 pages).
"International Search Report and Written Opinion mailed on Feb. 2, 2021", International PCT Patent Application No. PCT/US20/60550, (9 pages).
"International Search Report and Written Opinion mailed on Oct. 22, 2019", International PCT Patent Application No. PCT/US19/43751, (9 pages).
"International Search Report and Written Opinion mailed on Dec. 23, 2019", International PCT Patent Application No. PCT/US19/44953, (11 pages).
"International Search Report and Written Opinion mailed on May 23, 2019", International PCT Patent Application No. PCT/US18/66514, (17 pages).
"International Search Report and Written Opinion mailed on Sep. 26, 2019", International PCT Patent Application No. PCT/US19/40544, (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International PCT Application No. PCT/US19/47746, (16 pages).
"International Search Report and Written Opinion mailed on Dec. 3, 2020", International PCT Patent Application No. PCT/US20/43596, (25 pages).
"International Search Report and Written Opinion mailed on Sep. 30, 2019", International PCT Patent Application No. PCT/US19/40324, (7 pages).
"International Search Report and Written Opinion mailed on Sep. 4, 2020", International PCT Patent Application No. PCT/US20/31036, (13 pages).
"International Search Report and Written Opinion mailed on Jun. 5, 2020", International PCT Patent Application No. PCT/US20/19871, (9 pages).
"International Search Report and Written Opinion mailed on Aug. 8, 2019", International PCT Patent Application No. PCT/US2019/034763, (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International PCT Application No. PCT/US19/55185, (10 pages).
"International Search Report and Written Opinion mailed on Feb. 28, 2019", International PCT Patent Application No. PCT/US18/64686, (8 pages).
"International Search Report and Written Opinion mailed on Feb. 7, 2020", International PCT Patent Application No. PCT/US2019/061265, (11 pages).
"International Search Report and Written Opinion mailed on Jun. 11, 2019", International PCT Application No. PCT/US19/22620, (7 pages).
"Invitation to Pay Additional Fees mailed Aug. 15, 2019", International PCT Patent Application No. PCT/US19/36275, (2 pages).
"Invitation to Pay Additional Fees mailed Sep. 24, 2020", International PCT Patent Application No. PCT/US2020/043596, (3 pages).
"Invitation to Pay Additional Fees mailed on Oct. 22, 2019", International PCT Patent Application No. PCT/US19/47746, (2 pages).
"Invitation to Pay Additional Fees mailed on Apr. 3, 2020", International PCT Patent Application No. PCT/US20/17023, (2 pages).
"Invitation to Pay Additional Fees mailed on Oct. 17, 2019", International PCT Patent Application No. PCT/US19/44953, (2 pages).
"multi-core processor", TechTarget, 2013, (1 page).
"Non Final Office Action mailed Nov. 19. 2019", U.S. Appl. No. 16/355,611, (31 pages).
"Non Final Office Action mailed on Apr. 1, 2022", U.S. Appl. No. 17/256,961, (65 pages).
"Non Final Office Action mailed on Apr. 11, 2022", U.S. Appl. No. 16/938,782, (52 pages).
"Non Final Office Action mailed on Apr. 12, 2022", U.S. Appl. No. 17/262,991, (60 pages).
"Non Final Office Action mailed on Apr. 13, 2023", U.S. Appl. No. 17/098,043, (7 pages).
"Non Final Office Action mailed on Aug. 2, 2023", U.S. Appl. No. 17/807,600, (25 pages).
"Non Final Office Action mailed on Aug. 21, 2019", U.S. Appl. No. 15/564,517, (14 pages).
"Non Final Office Action mailed on Aug. 4, 2021", U.S. Appl. No. 16/864,721, (21 pages).
"Non Final Office Action mailed on Dec. 7, 2022", U.S. Appl. No. 17/357,795, (63 pages).
"Non Final Office Action mailed on Feb. 2, 2022", U.S. Appl. No. 16/783,866, (8 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Jan. 26, 2021", U.S. Appl. No. 16/928,313, (33 pages).
"Non Final Office Action mailed on Jan. 27, 2021", U.S. Appl. No. 16/225,961, (15 pages).
"Non Final Office Action mailed on Jul. 20, 2023", U.S. Appl. No. 17/650,188, (11 pages).
"Non Final Office Action mailed on Jul. 26, 2022", U.S. Appl. No. 17/098,059, (28 pages).
"Non Final Office Action mailed on Jul. 27, 2020", U.S. Appl. No. 16/435,933, (16 pages).
"Non Final Office Action mailed on Jul. 9, 2021", U.S. Appl. No. 17/002,663, (43 pages).
"Non Final Office Action mailed on Jul. 9, 2021", U.S. Appl. No. 16/833,093, (47 pages).
"Non Final Office Action mailed on Jun. 10, 2021", U.S. Appl. No. 16/938,782, (40 Pages).
"Non Final Office Action mailed on Jun. 14, 2023", U.S. Appl. No. 17/516,483, (10 pages).
"Non Final Office Action mailed on Jun. 17, 2020", U.S. Appl. No. 16/682,911, (22 pages).
"Non Final Office Action mailed on Jun. 19, 2020", U.S. Appl. No. 16/225,961, (35 pages).
"Non Final Office Action mailed on Jun. 29, 2021", U.S. Appl. No. 16/698,588, (58 pages).

(56) References Cited

OTHER PUBLICATIONS

"Non Final Office Action mailed on Mar. 1, 2023", U.S. Appl. No. 18/046,739, (34 pages).
"Non Final Office Action mailed on Mar. 3, 2021", U.S. Appl. No. 16/427,337, (41 pages).
"Non Final Office Action mailed on Mar. 31, 2022", U.S. Appl. No. 17/257,814, (60 pages).
"Non Final Office Action mailed on Mar. 9, 2022", U.S. Appl. No. 16/870,676, (57 pages).
"Non Final Office Action mailed on May 10, 2022", U.S. Appl. No. 17/140,921, (25 pages).
"Non Final Office Action mailed on May 11, 2023", U.S. Appl. No. 17/822,279, (24 pages).
"Non Final Office Action mailed on May 17, 2022", U.S. Appl. No. 16/748,193, (11 pages).
"Non Final Office Action mailed on May 26, 2021", U.S. Appl. No. 16/214,575, (19 pages).
"Non Final Office Action mailed on Nov. 19, 2019", U.S. Appl. No. 16/355,611, (31 pages).
"Non Final Office Action mailed on Nov. 5, 2020", U.S. Appl. No. 16/530,776, (45 pages).
"Non Final Office Action mailed on Oct. 22, 2019", U.S. Appl. No. 15/859,277, (15 pages).
"Non Final Office Action mailed on Sep. 1, 2020", U.S. Appl. No. 16/214,575, (40 pages).
"Non Final Office Action mailed on Sep. 19, 2022", U.S. Appl. No. 17/263,001, (14 pages).
"Non Final Office Action mailed on Sep. 20, 2021", U.S. Appl. No. 17/105,848, (56 pages).
"Non Final Office Action mailed on Sep. 29, 2021", U.S. Appl. No. 16/748,193, (62 pages).
"Notice of Allowance mailed on Jul. 27, 2023 with English translation", Korean Patent Application No. 10-2020-7019685, (4 pages).
"Notice of Allowance mailed on Mar. 25, 2020", U.S. Appl. No. 15/564,517, (11 pages).
"Notice of Allowance mailed on Oct. 5, 2020", U.S. Appl. No. 16/682,911, (27 pages).
"Notice of Reason for Rejection mailed on Oct. 28, 2022 with English translation", Japanese Patent Application No. 2020-531452, (3 pages).
"Notice of Reason of Refusal mailed on Sep. 11, 2020 with English translation", Japanese Patent Application No. 2019-140435, (6 pages).
"Office Action mailed May 31, 2023", Israeli Patent Application No. 275373, (5 pages).
"Office Action mailed on Apr. 13, 2023 with English translation", Japanese Patent Application No. 2020-533730, (13 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Office Action mailed on Mar. 30, 2023 with English translation", Japanese Patent Application No. 2020-566620, (10 pages).
"Office Action mailed on Nov. 24, 2022 with English Translation", Japanese Patent Application No. 2020-533730, (11 pages).
"Phototourism Challenge", CVPR 2019 Image Matching Workshop. https://image matching-workshop. github.io., (16 pages).
"Second Office Action mailed on Jul. 13, 2022 with English Translation", Chinese Patent Application No. 201880079474.6, (10 pages).
"Second Office Action mailed on Jun. 20, 2022 with English Translation", Chinese Patent Application No. 201880089255.6, (14 pages).
"Second Office Action mailed on May 2, 2023 with English Translation", Japanese Patent Application No. 2020-549034, (6 pages).
"Second Office Action mailed on Sep. 25, 2023 with English translation", Japanese Patent Application No. 2020-567853, (8 pages).
"Summons to attend oral proceedings pursuant to Rule 115(1) EPC mailed on Jul. 15, 2019", European Patent Application No. 15162521.7, (7 pages).
"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).
Aarik, J., et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract.
Anonymous, "Koi Pond: Top iPhone App Store Paid App", https://web.archive.org/web/20080904061233/https://www.iphoneincanada.ca/reviews/koi-pond-top-iphone-app-store-paid-app/—[retrieved on Aug. 9, 2022].
Arandjelović, Relja, et al., "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Battaglia, Peter W, et al., "Relational inductive biases, deep learning, and graph networks", arXiv:1806.01261, Oct. 17, 2018, pp. 1-40.
Berg, Alexander C, et al., "Shape matching and object recognition using low distortion correspondences", In CVPR, 2005, (8 pages).
Bian, Jiawang, et al., "GMS: Grid-based motion statistics for fast, ultra-robust feature correspondence.", In CVPR (Conference on Computer Vision and Pattern Recognition), 2017, (10 pages).
Bimber, Oliver, et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric, et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tibério S, et al., "Learning graph matching", IEEE TPAMI, 31(6):1048-1058, 2009.
Cech, Jan, et al., "Efficient sequential correspondence selection by cosegmentation", IEEE TPAMI, 32(9):1568-1581, Sep. 2010.
Chittineni, C., et al., "Single filters for combined image geometric manipulation and enhancement", Proceedings of SPIE vol. 1903, Image and Video Processing, Apr. 8, 1993, San Jose, CA. (Year: 1993), pp. 111-121.
Cuturi, Marco, "Sinkhorn distances: Lightspeed computation of optimal transport", NIPS, 2013, (9 pages).
Dai, Angela, et al., "ScanNet: Richly-annotated 3d reconstructions of indoor scenes", In CVPR, arXiv:1702.04405v2 [cs.CV] Apr. 11, 2017, (22 pages).
Deng, Haowen, et al., "PPFnet: Global context aware local features for robust 3d point matching", In CVPR, arXiv:1802.02669v2 [cs.CV] Mar. 1, 2018, (12 pages).

(56) References Cited

OTHER PUBLICATIONS

Detone, Daniel, et al., "Deep image homography estimation", In RSS Work-shop: Limits and Potentials of Deep Learning in Robotics, arXiv:1606.03798v1 [cs.CV] Jun. 13, 2016, (6 pages).

Detone, Daniel, et al., "Self-improving visual odometry", arXiv:1812.03245, Dec. 8, 2018, (9 pages).

Detone, Daniel, et al., "SuperPoint: Self-supervised interest point detection and description", In CVPR Workshop on Deep Learning for Visual SLAM, arXiv:1712.07629v4 [cs.CV] Apr. 19, 2018, (13 pages).

Dusmanu, Mihai, et al., "D2-net: A trainable CNN for joint detection and description of local features", CVPR, arXiv: 1905.03561v1 [cs.CV] May 9, 2019, (16 pages).

Ebel, Patrick, et al., "Beyond cartesian representations for local descriptors", ICCV, arXiv:1908.05547v1 [cs.CV] Aug. 15, 2019, (11 pages).

Fischler, Martin A, et al., "Random sample consensus: a paradigm for model fitting with applications to image analysis and automated cartography", Communications of the ACM, 24(6): 1981, pp. 381-395.

Gilmer, Justin, et al., "Neural message passing for quantum chemistry", In ICML, arXiv:1704.01212v2 [cs.LG] Jun. 12, 2017, (14 pages).

Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.

Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>.

Hartley, Richard, et al., "Multiple View Geometry in Computer Vision", Cambridge University Press, 2003, pp. 1-673.

Jacob, Robert J.K., "Eye Tracking in Advanced Interface Design", Human-Computer Interaction Lab, Naval Research Laboratory, Washington, D.C., date unknown. 2003, pp. 1-50.

Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.

Lee, Juho, et al., "Set transformer: A frame- work for attention-based permutation-invariant neural networks", ICML, arXiv:1810.00825v3 [cs.LG] May 26, 2019, (17 pages).

Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).

Levola, T., "Diffractive Optics for Virtual Reality Displays", Journal of the SID Eurodisplay 14/05, 2005, XP008093627, chapters 2-3, Figures 2 and 10, pp. 467-475.

Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.

Li, Yujia, et al., "Graph Matching Networks for Learning the Similarity of Graph Structured Objects", arxiv.org, Cornell University Library, 201 Olin Library Cornell University Ithaca, NY 14853, XP081268608.

Li, Yujia, et al., "Graph matching networks for learning the similarity of graph structured objects", ICML, arXiv:1904.12787v2 [cs.LG] May 12, 2019, (18 pages).

Li, Zhengqi, et al., "Megadepth: Learning single-view depth prediction from internet photos", In CVPR, fromarXiv: 1804.00607v4 [cs.CV] Nov. 28, 2018, (10 pages).

Libovicky, et al., "Input Combination Strategies for Multi-Source Transformer Decoder", Proceedings of the Third Conference on Machine Translation (WMT). vol. 1: Research Papers, Belgium, Brussels, Oct. 31,-Nov. 1, 2018; retrieved on Jan. 8, 2021 (Jan. 8, 2021 ) from < URL: https://doi.org/10.18653/v1/W18-64026 >, entire document.

Loiola, Eliane Maria, et al., "A survey for the quadratic assignment problem", European journal of operational research, 176(2): 2007, pp. 657-690.

Lowe, David G, "Distinctive image features from scale- invariant keypoints", International Journal of Computer Vision, 60(2): 91-110, 2004, (28 pages).

Luo, Zixin, et al., "ContextDesc: Local descriptor augmentation with cross-modality context", CVPR, arXiv:1904.04084v1 [cs.CV] Apr. 8, 2019, (14 pages).

Luo, Zixin, et al., "ContextDesc: Local Descriptor Augmentation With Cross-Modality Context", 2019 IEEE/CVF Conference on Computer Vision and Pattern Recognition (CVPR), IEEE, XP033686823, Doi: 10.1109/CVPR.2019.00263 [retrieved on Jan. 8, 2020], pp. 2522-2531.

Memon, F., et al., "Synthesis, Characterization and Optical Constants of Silicon Oxycarbide", EPJ Web of Conferences; Publication [online]. Mar. 23, 2017 [retrieved Feb. 19, 2020) .<URL: https://www.epj-conferences.org/articles/epjconf/pdf/2017/08/epjconf_nanop2017_00002.pdf>; DOI: 10.1051/epjconf/201713900002, (8 pages).

Molchanov, Pavlo, et al., "Short-range FMCW monopulse radar for hand-gesture sensing", 2015 IEEE Radar Conference (RadarCon) (2015), pp. 1491-1496.

Mrad, et al., "A framework for System Level Low Power Design Space Exploration", 1991.

Munkres, James, "Algorithms for the assignment and transportation problems", Journal of the Society for Industrial and Applied Mathematics, 5(1): 1957, pp. 32-38.

Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).

Paszke, Adam, et al., "Automatic differentiation in Pytorch", 31st Conference on Neural Information Processing Systems (NIPS 2017), Long Beach, CA, USA, (4 pages).

Peyré, Gabriel, et al., "Computational Optimal Transport", Foundations and Trends in Machine Learning, 11(5-6):355-607, 2019; arXiv: 1803.00567v4 [stat.ML] Mar. 18, 2020, (209 pages).

Qi, Charles Ruizhongtai, et al., "Pointnet++: Deep hierarchical feature learning on point sets in a metric space.", 31st Conference on Neural Information Processing Systems (NIPS 2017), Long Beach, CA, USA., Jun. 7, 2017, (10 pages).

Qi, Charles R, et al., "Pointnet: Deep Learning on Point Sets for 3D Classification and Segmentation", CVPR, arXiv:1612.00593v2 [cs.CV] Apr. 10, 2017, (19 pages).

Radenović, Filip, et al., "Revisiting Oxford and Paris: Large-Scale Image Retrieval Benchmarking", CVPR, arXiv:1803.11285v1 [cs.CV] Mar. 29, 2018, (10 pages).

Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).

Ranftl, René, et al., "Deep fundamental matrix estimation", European Conference on Computer Vision (ECCV), 2018, (17 pages).

Revaud, Jerome, et al., "R2D2: Repeatable and Reliable Detector and Descriptor", In NeurIPS, arXiv:1906.06195v2 [cs.CV] Jun. 17, 2019, (12 pages).

Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).

Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).

Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document.

(56) References Cited

OTHER PUBLICATIONS

Sattler, Torsten, et al., "Scramsac: Improving Ransac's efficiency with a spatial consistency filter", ICCV, 2009: 2090-2097., (8 pages).
Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, Issn: 0146-9592, pp. 1642-1644.
Sinkhorn, Richard, et al., "Concerning nonnegative matrices and doubly stochastic matrices.", Pacific Journal of Mathematics, 1967, pp. 343-348.
Spencer, T., et al., "Decomposition of poly(propylene carbonate) with UV sensitive iodonium 11 salts", Polymer Degradation and Stability; (online]. Dec. 24, 2010 (retrieved Feb. 19, 2020]., (17 pages).
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv: 1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).
Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
Zhang, Zen, et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], pp. 5086-5095.
"Communication Pursuant to Article 94(3) EPC mailed Nov. 28, 2024", European Patent Application No. 19885958.9, (5 pages).
"Communication Pursuant to Article 94(3) EPC mailed on Mar. 11, 2024", European Patent Application No. 20798769.4, (12 pages).
"Communication Pursuant to Article 94(3) EPC mailed on Nov. 21, 2024", European Patent Application No. 20846338.0, (11 pages).
"Extended European Search Report issued on Dec. 2, 2024", European Patent Application No. 24167829.1, (7 pages).
"First Office Action mailed Mar. 20, 2024 with English translation", Chinese Patent Application No. 202080048293.4, (22 pages).
"First Office Action mailed Oct. 17, 2024 with English translation", Japanese Patent Application No. 2022-527990, (24 pages).
"First Office Action with English translation dated Aug. 8, 2024", Chinese Patent Application No. 202080053774.4, (23 pages).
"Notice of Reasons for Rejection mailed on Dec. 4, 2024 with English tranlsation", Japanese Patent Application No. 2023-118968, (9 pages).
"Office Action mailed on Nov. 7, 2024 with English translation", Korean Patent Application No. 10-2024-7032937, (7 pages).
"Penultimate Office Action mailed on Sep. 17, 2024 with English translation", Japanese Patent Application No. 2023-115047, (7 pages).
"Second Office Action with English translation mailed on Jul. 2, 2024", Chinese Patent Application No. 201980032005.3, (15 pages).

\* cited by examiner

UNFUSED POSE-BASED DRIFT CORRECTION OF A FUSED POSE OF A TOTEM IN A USER INTERACTION SYSTEM

CROSS-REFERENCE TO RELATED APPLICATIONS

This application is a continuation of U.S. patent application Ser. No. 18/165,715, filed on Feb. 7, 2023, which is a continuation of U.S. patent application Ser. No. 17/518,148, filed on Nov. 3, 2021 now U.S. Pat. No. 11,609,645, which is a continuation of U.S. patent application Ser. No. 17/002,663, filed on Aug. 25, 2020 now U.S. Pat. No. 11,216,086, which is a continuation of U.S. patent application Ser. No. 16/523,779, filed on Jul. 26, 2019 now U.S. Pat. No. 10,795,458, which claims priority from U.S. Provisional Patent Application No. 62/818,032, filed on Mar. 13, 2019 and U.S. Provisional Patent Application No. 62/714,609, filed on Aug. 3, 2018, all of which are incorporated herein by reference in their entirety.

BACKGROUND OF THE INVENTION

1). Field of the Invention

This invention relates to a user interaction system having a totem that defines a six degree of freedom ("6dof") pose, or pose, of a virtual object that is perceived by a user.

2). Discussion of Related Art

Modern computing and display technology has facilitated the development of user interaction systems that include "augmented reality" viewing devices. Such a viewing device usually has a head unit with a head unit body that is mountable to a head of a user and frequently includes two waveguides, one in front of each eye of the user. The waveguides are transparent so that ambient light from real-world objects can transmit through the waveguides and the user can see the real-world objects. Each waveguide also serves to transmit projected light from a projector to a respective eye of the user. The projected light forms an image on the retina of the eye. The retina of the eye thus receives the ambient light and the projected light. The user simultaneously sees real-world objects and one or more virtual objects that are created by the projected light.

Such a user interaction system often includes a totem. The user may for example, hold the totem in their right hand and move the totem with six degrees of freedom in three-dimensional space. A virtual object may be perceived by the user to be attached to the totem and move with the totem in three-dimensional space, or the virtual object may be the perception of a light beam that hits the wall or another object that the user moves across the wall.

It is important for the virtual object to remain in its realistic pose relative to the totem. For example, if the totem represents the handle of a racket and the virtual object represents a head of the racket, the head of the racket has to remain "attached" to the handle of the racket over time.

SUMMARY OF THE INVENTION

The invention provides a user interaction system including a totem having a totem body, an electromagnetic (EM) transmitter on the totem body and a totem inertial measurement unit (IMU) located on the totem, to generate a totem IMU signal due to movement of the totem; a head unit having a head unit body and an EM receiver on the head unit body to receive an EM wave transmitted by the EM transmitter, the EM wave being indicative of a location of the totem; a processor; a storage device connected to the processor and a set of instructions on the storage device and executable by the processor. The set of instructions includes a world frame, a fusion routine connected to the EM receiver and the totem IMU to generate a fused pose of the totem in the world frame based on a combination of the EM wave, the head unit pose, and the totem IMU data, an unfused pose determination modeler that determines a pose of the totem relative to the head unit and a pose of the head unit relative to the world frame to establish an unfused pose of the totem relative to the world frame, a comparator connected to the fused pose determination modeler and the unfused pose determination modeler to compare the fused pose with the unfused pose, a drift declarer connected to the comparator to declare a drift only if the fused pose is more than a predetermined distance from the unfused pose, a location correction routine connected to the drift declarer to reset a pose of the totem IMU to match the unfused location only if the drift is declared, a data source to carry image data and a display system connected to the data source to display a virtual object using the image data to a user, a location of the virtual object being based on the fused location of the totem.

The invention also provides a user interaction system including transmitting an electromagnetic (EM) wave with an EM transmitter on a totem body, generating a totem inertial measurement unit (IMU) signal with a totem IMU on the totem body due to movement of the totem, locating a head unit body on a head of a user, receiving the EM wave transmitted by the EM transmitter by an EM receiver on the head unit body, the EM wave being indicative of a pose of the totem, storing a world frame, executing, with a processor, a fusion routine to generate a fused pose of the totem in the world frame based on a combination of the EM wave, head unit pose, and the totem IMU data, executing, with the processor, an unfused pose determination modeler that determines a pose of the totem relative to the head unit and a location of the head unit relative to the world frame to establish an unfused pose of the totem relative to the world frame, executing, with the processor, a comparator to compare the fused pose with the unfused pose, executing, with the processor, a drift declarer to declare a drift only if the fused pose is more than a predetermined pose from the unfused pose, executing, with the processor, a pose correction routine to reset pose of the totem IMU to match the unfused pose only if the drift is declared, receiving image data from a data source; and displaying, with a display system connected to the data source, a virtual object using the image data to a user, a location of the virtual object being based on the fused location of the totem.

BRIEF DESCRIPTION OF THE DRAWINGS

The invention is further described by way of example with reference to the accompanying drawings, wherein.

DETAILED DESCRIPTION OF THE INVENTION

Figure 1:
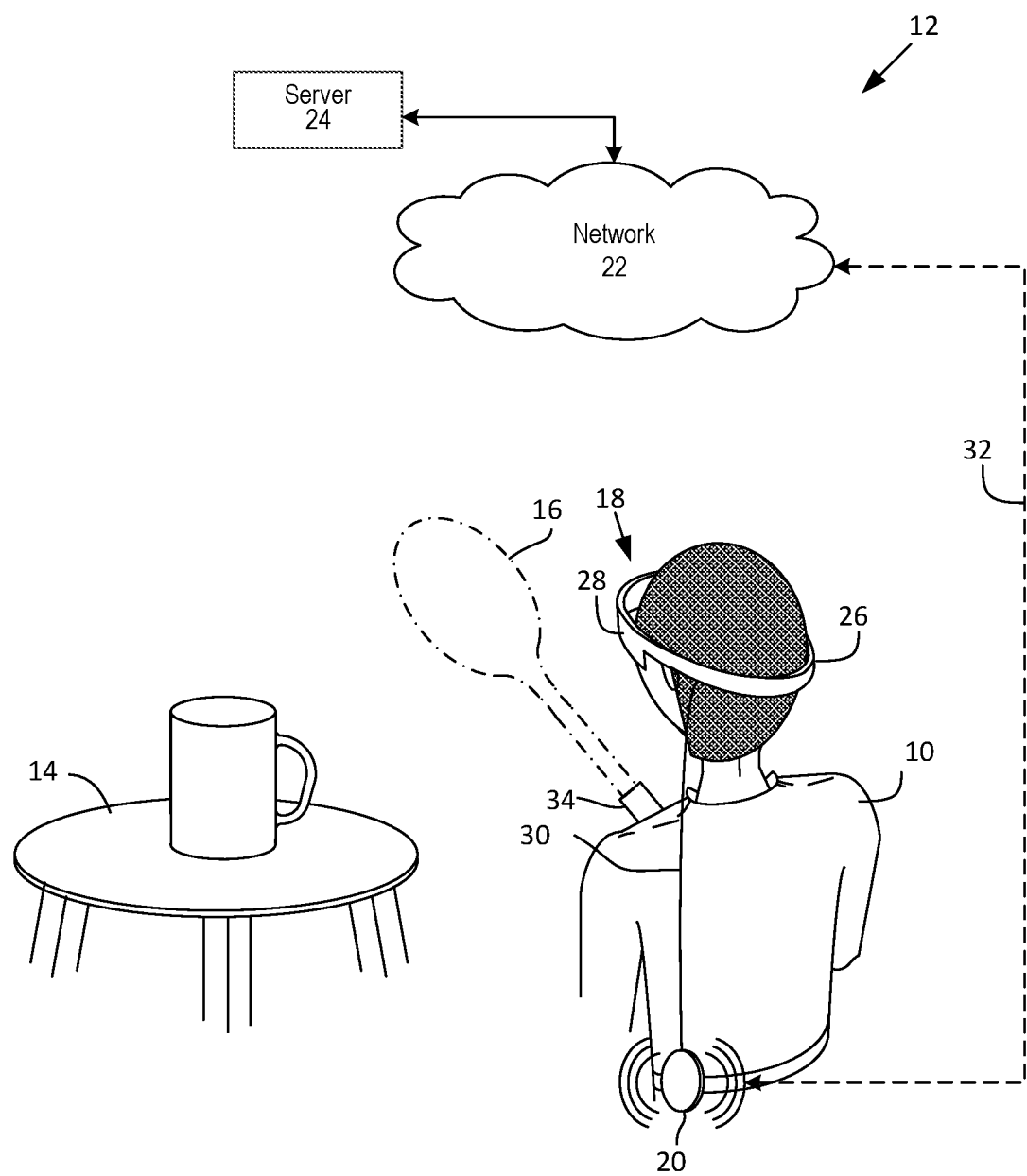
FIG. 1 is a perspective view illustrating a user interaction system, according to an embodiment of the invention.

FIG. 1 of the accompanying drawings illustrates a user 10, a user interaction system 12, according to an embodiment of the invention, a real-world object 14 in the form of a table, and a virtual object 16, which is not visible from the perspective of the figure but is visible to the user 10.

The user interaction system 12 includes a head unit 18, a belt pack 20, a network 22 and a server 24.

The head unit 18 includes a head unit body 26 and a display system 28. The head unit body 26 has a shape that fits over a head of the user 10. The display system 28 is secured to the head unit body 26.

The belt pack 20 has a processor and a storage device connected to the processor. Vision algorithms are stored on the storage device and are executable by the processor. The belt pack 20 is communicatively connected to the display system 28 with a cable connection 30. The belt pack 20 further includes a network interface device that permits the belt pack 20 to connect wirelessly over a link 32 with the network 22. The server 24 is connected to the network 22.

In use, the user 10 secures the head unit body 26 to their head. The display system 28 includes an optical waveguide (not shown) that is transparent so that the user 10 can see the real-world object 14 through the waveguide.

The belt pack 20 may download image data from the server 24 over the network 22 and the link 32. The belt pack 20 provides the image data through the cable connection 30 to the display system 28. The display system 28 has one or more projectors that create light based on the image data. The light propagates through the one or more optical waveguides to eyes of the user 10. Each waveguide creates light at a particular focal length on a retina of a respective eye so that the eye sees the virtual object 16 at some distance behind the display system 28. The eye thus sees the virtual object 16 in three-dimensional space. Additionally, slightly different images are created for each eye so that a brain of the user 10 perceives the virtual object 16 in three-dimensional space. The user 10 thus sees the real-world object 14 augmented with the virtual object 16 in three-dimensional space.

The user interaction system 12 further includes a totem 34. In use, the user 10 holds the totem 34 in one of their hands. The virtual object 16 is positioned in three-dimensional space based on the positioning of the totem 34. By way of example, the totem 34 may be a handle of a racket and the virtual object 16 may include the head of the racket. The user 10 can move the totem 34 in six degrees of freedom in three-dimensional space. The totem 34 thus moves in three-dimensional space relative to the real-world object 14 and the head unit body 26. Various components within the head unit 18 and the belt pack 20 track movement of the totem 34 and move the virtual object 16 together with the totem 34. The head of the racket thus remains attached to the handle in the view of the user 10.

Figure 2:
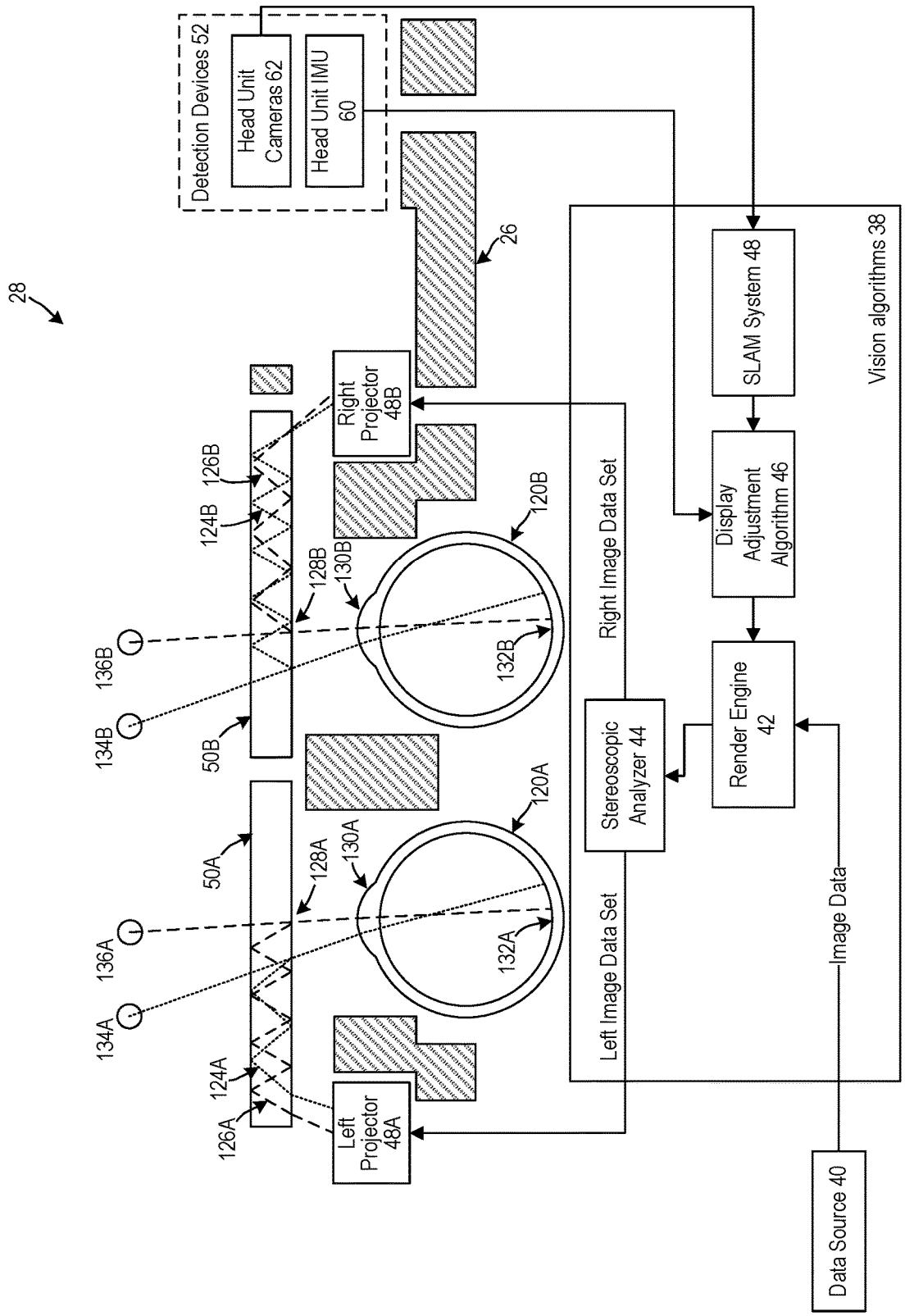
FIG. 2 is a block diagram illustrating components of the user interaction system as it relates to a head unit and vision algorithms for the head unit.

FIG. 2 illustrates the display system 28 in more detail together with vision algorithms 38. The vision algorithms 38 primarily reside within the belt pack 20 in FIG. 1. In other embodiments, the vision algorithms 38 may reside entirely within a head unit or may be split between a head unit and a belt pack. FIG. 2 further includes a data source 40. In the present example, the data source 40 includes image data that is stored on a storage device of the belt pack 20. The image data may for example, be three-dimensional image data that can be used to render the virtual object 16. In alternate embodiments, the image data may be time sequenced image data that allows for the creation of a video that moves in two- or three-dimensions, and may have as its purpose attachment to a totem, be located on a real-world object, or be in a fixed position in front of a user when the user moves their head.

The vision algorithms 38 include a render engine 42, a stereoscopic analyzer 44, a display adjustment algorithm 46 and a simultaneous localization and mapping (SLAM) system 48.

The render engine 42 is connected to the data source 40 and the display adjustment algorithm 46. The render engine 42 is capable of receiving inputs from various systems, in the present example the display adjustment algorithm 46, and positions the image data within a frame that is to be viewed by the user 10 based on the display adjustment algorithm 46. The display adjustment algorithm 46 is connected to the SLAM system 48. The SLAM system 48 is capable of receiving image data, analyzing the image data for purposes of determining objects within images of the image data, and recording the locations of the objects within the image data.

The stereoscopic analyzer 44 is connected to the render engine 42. The stereoscopic analyzer 44 is capable of determining left and right image data sets from a data stream that is provided by the render engine 42.

The display system 28 includes left and right projectors 48A and 48B, left and right waveguides 50A and 50B, and detection devices 52. The left and right projectors 48A and 48B are connected to power supplies. Each projector 48A or 48B has a respective input for image data to be provided to the respective projector 48A or 48B. The respective projector 48A or 48B, when powered, generates light in a two-dimensional pattern and emanates the light therefrom. The left and right waveguides 50A and 50B are positioned to receive the light from the left and right projectors 48A and 48B, respectively. The left and right waveguides 50A and 50B are transparent waveguides.

The detection devices 52 include a head unit inertial motion unit (IMU) 60 and one or more head unit cameras 62. The head unit IMU 60 includes one or more gyroscopes and one or more accelerometers. The gyroscopes and accelerometers are typically formed in a semiconductor chip and are capable of detecting movement of the head unit IMU 60 and the head unit body 26, including movement along three orthogonal axes and rotation about three orthogonal axes.

The head unit cameras 62 continually capture images from an environment around the head unit body 26. The images can be compared to one another to detect movement of the head unit body 26 and the head of the user 10.

The SLAM system 48 is connected to the head unit cameras 62. The display adjustment algorithm 46 is connected to the head unit IMU 60. One of ordinary skill in the art will appreciate that the connections between the detection devices 52 and the vision algorithms 38 are accomplished through a combination of hardware, firmware and software. The components of the vision algorithms 38 are linked to one another through subroutines or calls.

In use, the user 10 mounts the head unit body 26 to their head. Components of the head unit body 26 may for example, include a strap (not shown) that wraps around the back of a head of the user 10. The left and right waveguides 50A and 50B are then located in front of left and right eyes 120A and 120B of the user 10.

The render engine 42 receives image data from the data source 40. The render engine 42 enters the image data into the stereoscopic analyzer 44. The image data is three-dimensional image data of the virtual object 16 in FIG. 1. The stereoscopic analyzer 44 analyzes the image data to determine left and right image data sets based on the image data. The left and right image data sets are data sets that represent two-dimensional images that differ slightly from one another for purposes of giving the user 10 a perception of a three-dimensional rendering. In the present embodiment, the image data is a static data set that does not change over time.

The stereoscopic analyzer 44 enters the left and right image data sets into the left and right projectors 48A and 48B. The left and right projectors 48A and 48B then create left and right light patterns. The components of the display system 28 are shown in plan view, although it should be understood that the left and right patters are two-dimensional patterns when shown in front elevation view. Each light pattern includes a plurality of pixels. For purposes of illustration, light rays 124A and 126A from two of the pixels are shown leaving the left projector 48A and entering the left waveguide 50A. The light rays 124A and 126A reflect from sides of the left waveguide 50A. It is shown that the light rays 124A and 126A propagate through internal reflection from left to right within the left waveguide 50A, although it should be understood that the light rays 124A and 126A also propagate in a direction into the paper using refractory and reflective systems.

The light rays 124A and 126A exit the left light waveguide 50A through a pupil 128A and then enter a left eye 120A through a pupil 130A of the left eye 120A. The light rays 124A and 126A then fall on a retina 132A of the left eye 120A. In this manner, the left light pattern falls on the retina 132A of the left eye 120A. The user 10 is given the perception that the pixels that are formed on the retina 132A are pixels 134A and 136A that the user 10 perceives to be at some distance on a side of the left waveguide 50A opposing the left eye 120A. Depth perception is created by manipulating the focal length of the light.

In a similar manner, the stereoscopic analyzer 44 enters the right image data set into the right projector 48B. The right projector 48B transmits the right light pattern, which is represented by pixels in the form of light rays 124B and 126B. The light rays 124B and 126B reflect within the right waveguide 50B and exit through a pupil 128B. The light rays 124B and 126B then enter through a pupil 130B of the right eye 120B and fall on a retina 132B of a right eye 120B. The pixels of the light rays 124B and 126B are perceived as pixels 134B and 136B behind the right waveguide 50B.

The patterns that are created on the retinas 132A and 132B are individually perceived as left and right images. The left and right images differ slightly from one another due to the functioning of the stereoscopic analyzer 44. The left and right images are perceived in a mind of the user 10 as a three-dimensional rendering.

As mentioned, the left and right waveguides 50A and 50B are transparent. Light from a real-life object on a side of the left and right waveguides 50A and 50B opposing the eyes 120A and 120B can project through the left and right waveguides 50A and 50B and fall on the retinas 132A and 132B. In particular, light from the real-world object 14 in FIG. 1 falls on the retinas 132A and 132B so that the user 10 can see the real-world object 14. Additionally, the user 10 can see the totem 34 and augmented reality is created wherein the real-world object 14 and the totem 34 are augmented with a three-dimensional rendering of the virtual object 16 that is perceived by the user 10 due to the left and right images that are, in combination, perceived by the user 10.

The head unit IMU 60 detects every movement of the head of the user 10. Should the user 10, for example, move their head counterclockwise and simultaneously move their body together with their head towards the right, such movement will be detected by the gyroscopes and accelerometers in the head unit IMU 60. The head unit IMU 60 provides the measurements from the gyroscopes and the accelerometers to the display adjustment algorithm 46. The display adjustment algorithm 46 calculates a placement value and provides the placement value to the render engine 42. The render engine 42 modifies the image data received from the data source 40 to compensate for the movement of the head of the user 10. The render engine 42 provides the modified image data to the stereoscopic analyzer 44 for display to the user 10.

The head unit cameras 62 continually capture images as the user 10 moves their head. The SLAM system 48 analyzes the images and identifies images of objects within the image. The SLAM system 48 analyzes movement of the objects to determine a pose position of the head unit body 26. The SLAM system 48 provides the pose position to the display adjustment algorithm 46. The display adjustment algorithm 46 uses the pose position to further refine the placement value that the display adjustment algorithm 46 provides to the render engine 42. The render engine 42 thus modifies the image data received from the data source 40 based on a combination of the motion sensors in the head unit IMU 60 and images taken by the head unit cameras 62. By way of a practical example, if the user 10 rotates their head to the right, a location of the virtual object 16 rotates to the left within the view of the user 10 thus giving the user 10 the impression that the location of the virtual object 16 remains stationary relative to the real-world object 14 and the totem 34.

Figure 3:
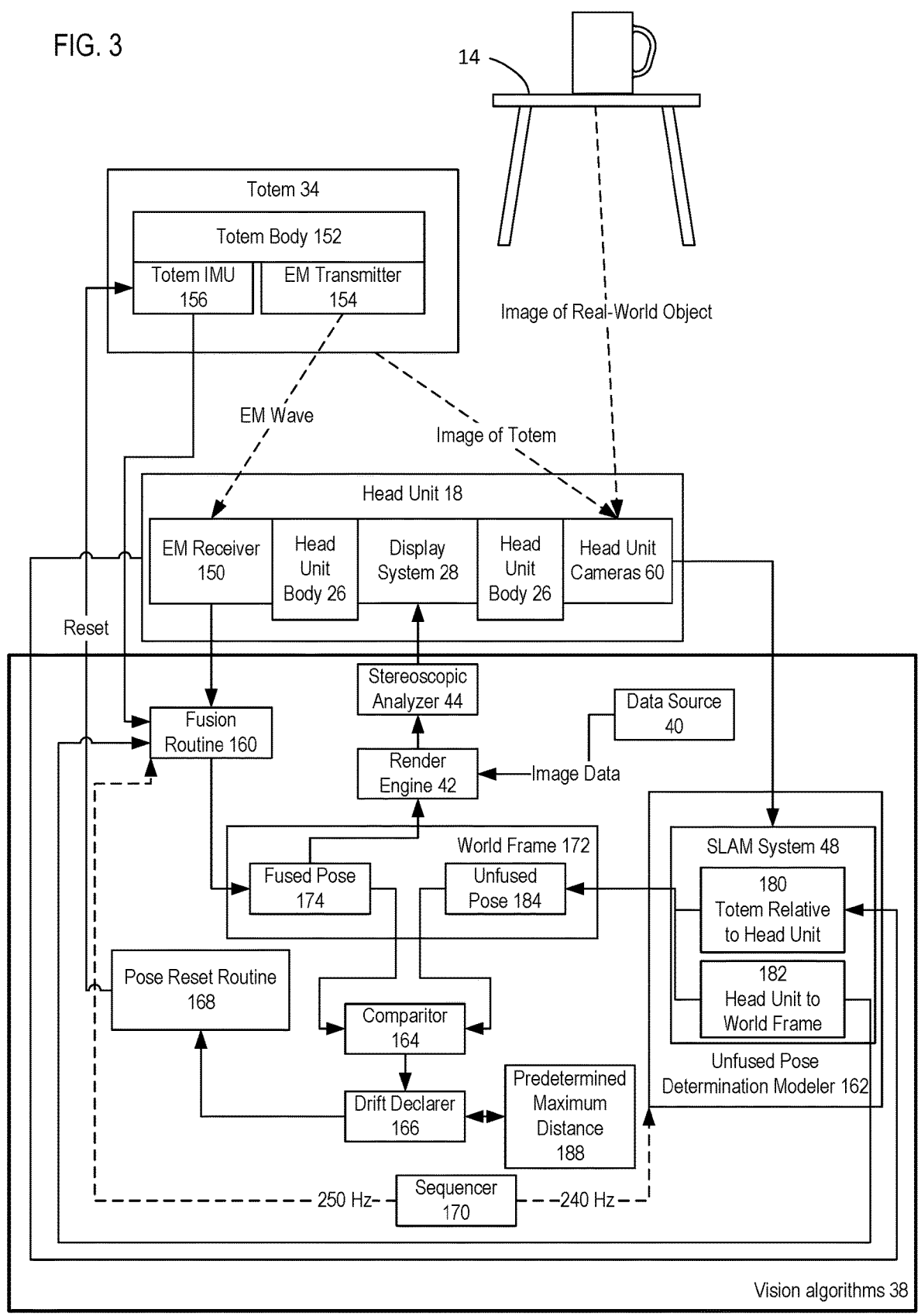
FIG. 3 is block diagram of the user interaction system as it relates to a totem and vision algorithms for the totem.

FIG. 3 illustrates further details of the head unit 18, the totem 34 and the vision algorithms 38. The head unit 18 further includes an electromagnetic (EM) receiver 150 secured to the head unit body 26. The display system 28, head unit cameras 62 and EM receiver 150 are mounted in fixed positions relative to the head unit body 26. If the user 10 moves their head, the head unit body 26 moves together with the head of the user 10 and the display system 28, head unit cameras 62 and EM receiver 150 move together with the head unit body 26.

The totem 34 has a totem body 152, an EM transmitter 154 and a totem IMU 156. The EM transmitter 154 and the totem IMU 156 are mounted in fixed positions relative to the totem body 152. The user 10 holds on to the totem body 152 and when the user 10 moves the totem body 152, the EM transmitter 154 and the totem IMU 156 move together with the totem body 152. The EM transmitter 154 is capable of transmitting an EM wave and the EM receiver 150 is capable of receiving the EM wave. The totem IMU 156 has one or more gyroscopes and one or more accelerometers. The gyroscopes and accelerometers are typically formed in a semiconductor chip and are capable of detecting movement of the totem IMU 156 and the totem body 152, including movement along three orthogonal axes and rotation about three orthogonal axes.

The vision algorithms 38, in addition to the data source 40, render engine 42, stereoscopic analyzer 44 and SLAM system 48 described with reference to FIG. 2 further include a fusion routine 160, an unfused pose determination modeler 162, a comparator 164, a drift declarer 166, a pose correction routine 168, and a sequencer 170.

The head unit cameras 62 capture images of the real-world object 14. The images of the real-world object 14 are processed by the SLAM system 48 to establish a world frame 172 as described with reference to FIG. 2. Details of how the SLAM system 48 establishes the world frame 172 are not shown in FIG. 3 so as not obscure the drawing.

The EM transmitter 154 transmits an EM wave that is received by the EM receiver 150. The EM wave that is received by the EM receiver 150 indicates a pose or a change of a pose of the EM transmitter 154. The EM receiver 150 enters data of the EM wave into the fusion routine 160.

The totem IMU 156 continually monitors movement of the totem body 152. Data from the totem IMU 156 is entered into the fusion routine 160.

The sequencer 170 executes the fusion routine 160 at a frequency of 250 Hz. The fusion routine 160 combines the data from the EM receiver 150 with the data from the totem IMU 156 and from the SLAM system 48. The EM wave that is received by the EM receiver 150 includes data that represents relatively accurately the pose of the EM transmitter 154 relative to the EM receiver 150 in six degrees of freedom ("6dof"). However, due to EM measurement noise, the measured EM wave may not accurately represent the pose of the EM transmitter 154 relative to the EM receiver 150. The EM measurement noise may result in jitter of the virtual object 16 in FIG. 1. The purpose of combining the data from the totem IMU 156 is to reduce jitter. The fusion routine 160 provides a fused pose 174 within the world frame 172. The fused pose 174 is used by the render engine 42 for purposes of determining the pose of the virtual object 16 in FIG. 1 using the image data from the data source 40.

Figure 4:
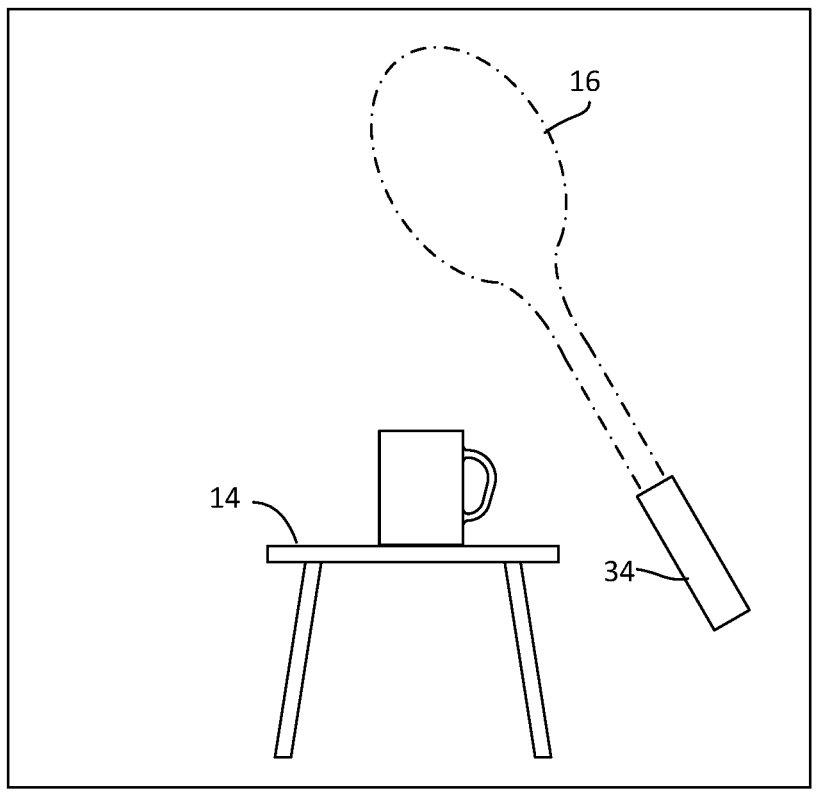
FIG. 4 is a front view illustrating how the user sees and perceives real and virtual objects.

As shown in FIG. 4, the virtual object 16 is shown in a correct pose relative to the totem 34. Furthermore, if the user 10 moves the totem 34, the virtual object 16 moves together with the totem 34 with a minimal amount of jitter.

The totem IMU 156 essentially measures acceleration and angular rate in six degrees of freedom. The acceleration and angular rate are integrated to determine a location and orientation of the totem IMU 156. Due to integration errors, the fused pose 174 may drift over time.

Figure 5:
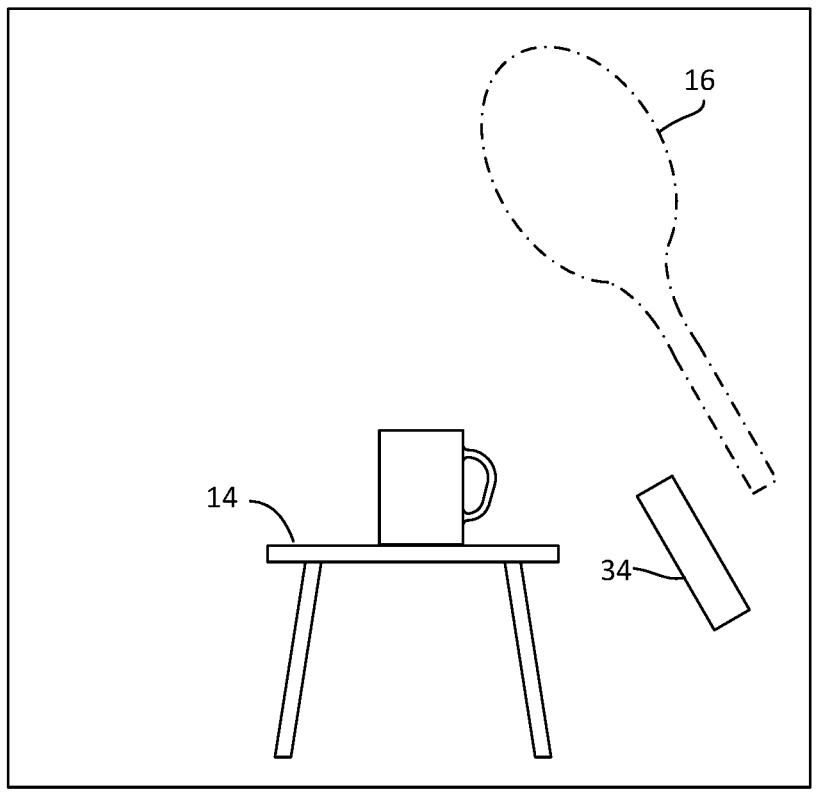
FIG. 5 is a view similar to FIG. 4 after a virtual object has drifted within the view of the user.

FIG. 5 illustrates that the virtual object 16 has drifted from its correct pose relative to the totem 34. The drift could be caused by the so-called "model mismatch", i.e., the imperfect mathematical models that describe the relationship between the physical quantities (e.g., 6dof, acceleration, and angular rate) and the actually measured signal (such as the EM wave measurement, and the IMU signals). And such drift could be amplified for high dynamic motion that can even lead to the fusion algorithm to diverge (i.e., the virtual object would like to be "blown away" from the actual object). In the present example, the virtual object 16 has drifted to the right relative to the totem 34. The fused pose 174 in FIG. 3 is based on the belief by the system that the totem 34 is located further to the right than where it actually is located. The fused data thus has to be corrected so that virtual object 16 is again placed in its correct location relative to the totem 34 as shown in FIG. 4.

In FIG. 3, the sequencer 170 executes the unfused pose determination modeler 162 at a frequency of 240 Hz. The unfused pose determination modeler 162 thus executes asynchronously relative to the fusion routine 160. In the present example, the unfused pose determination modeler 162 makes use of the SLAM system 48 to determine the location of the totem 34. Other systems my use other techniques to determine the location of the totem 34.

The head unit cameras 62 routinely capture images of the totem 34 together with the images of the real-world objects such as the real-world object 14. The images that are captured by the head unit cameras 62 are entered into the SLAM system 48. The SLAM system 48, in addition to determining the locations of the real-world objects such as the real-world object 14, also determines the location of the totem 34. As such, the SLAM system 48 establishes a relationship 180 of the totem 34 relative to the head unit 18. The SLAM system 48 also relies on data from the EM receiver 150 for establishing the relationship 180.

The SLAM system 48 also establishes a relationship 182 of the head unit relative to the world frame 172. As mentioned earlier, the fusion routine 60 receives an input from the SLAM system 48. The fusion routine used the relationship 182 of the head unit to the world frame, i.e. the head pose, as part of the calculations of the fused model of the pose of the totem 34.

The relative pose of the totem 34 to the head unit 18 is established by solving the EM dipole model from the measurement by the EM Receiver 150. The two relationships 180 and 182 thus establish a pose of the totem 34 within the world frame 172. The relationship of the totem 34 and the world frame 172 is stored as an unfused pose 184 within the world frame 172.

The comparator 164 executes synchronously together with the unfused pose determination modeler 162. The comparator 164 compares the fused pose 174 with the unfused location 184. The comparator 164 then enters a difference between the fused pose 174 and the unfused pose 184 into the drift declarer 166. The drift declarer 166 declares a drift only if the difference between the fused pose 174 and unfused pose 184 is more than a predetermined maximum distance 188 that is stored within the vision algorithms 38. The predetermined maximum distance 188 is typically less than 100 mm, and is preferably on the order of 30 mm, 20 mm or more preferably 10 mm and are determined or tuned through data analysis of the sensor fusion system. The drift declarer 166 does not declare a drift if the difference between the fused pose 174 and unfused pose 184 is less than the predetermined maximum distance 188.

When the drift declarer 166 declares a drift, the drift declarer 166 enters the pose reset routine 168. The pose reset routine 168 uses the unfused pose 184 to reset the fused pose 174 in the fusion routine 160, so the drifting is stopped and fusion routine 160 re-starts a pose tracking with the drifting being eliminated.

Figure 6:
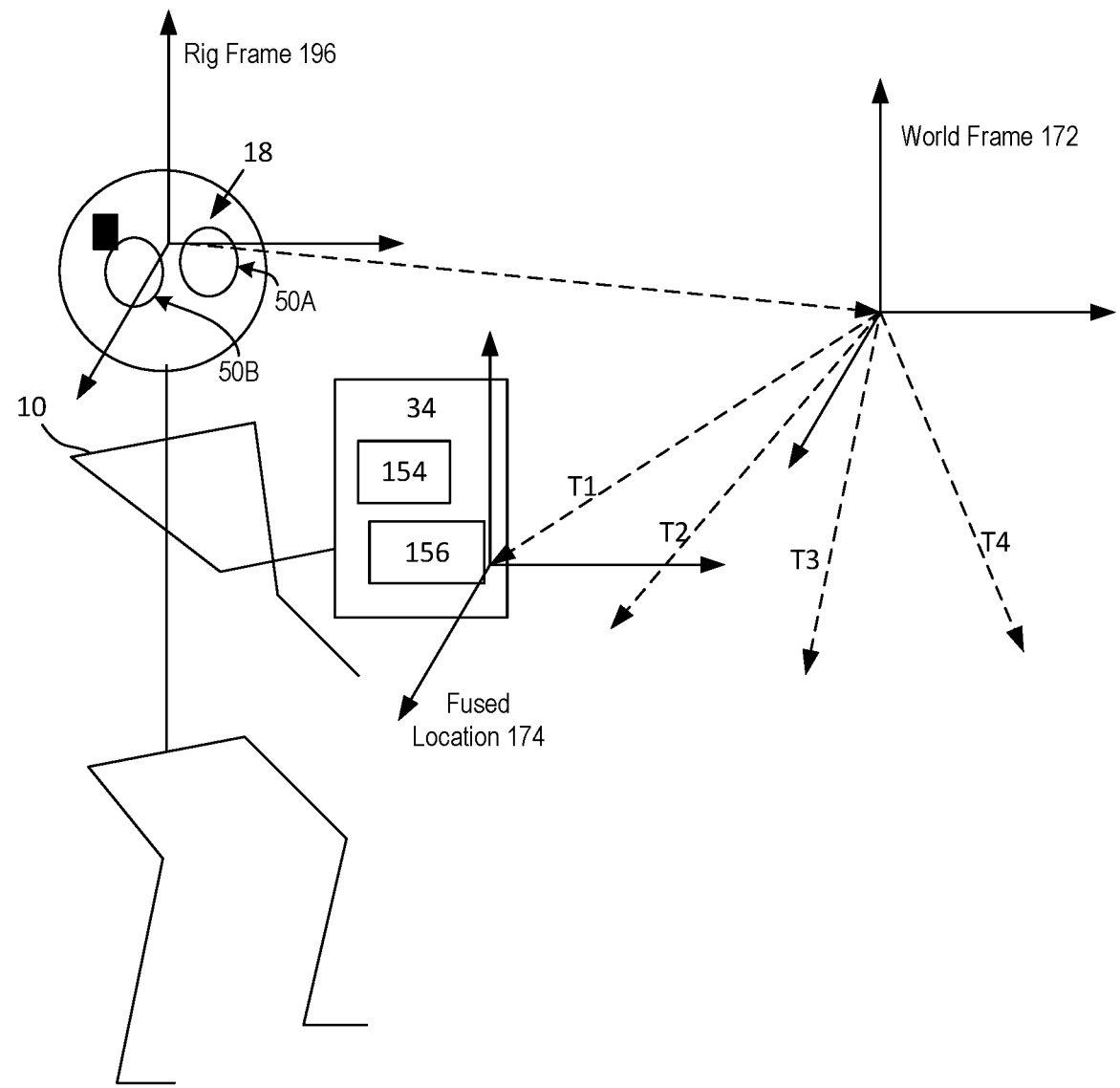
FIG. 6 is a perspective view illustrating drift of a fused location over time.

FIG. 6 illustrates a relationship between a rig frame 196, the world frame 172 and the fused pose 174. The rig frame 196 is a mathematical object that represents a head frame of the head unit 18. The rig frame 196 is located between the waveguides 50A and 50B. In a high-dynamic motion scenario, the fused pose 174 may drift over time (T1; T2; T3; T4) due to imperfect modeling of the actual EM Receiver measurement. The fused pose 174 initially represents the actual pose of the totem 34, but in such a high-dynamic motion scenario it may progressively fail to represent the actual pose of the totem 34 as it drifts further from the actual pose of the totem 34 over time.

Figure 7:
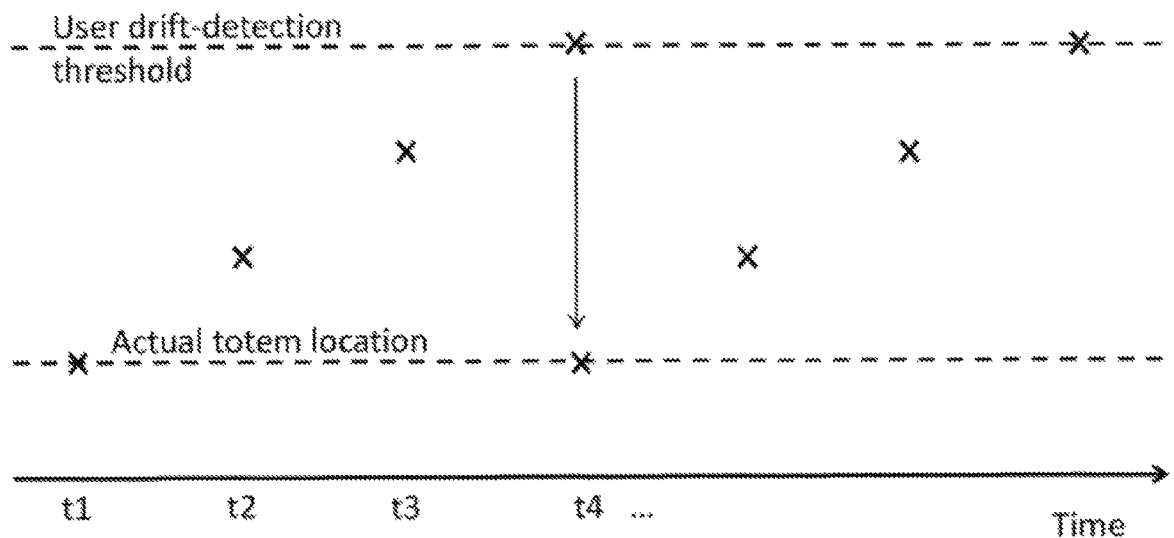
FIG. 7 is a graph illustrating how drift can be corrected using a distance calculation.

FIG. 7 illustrates one method of correcting for the drift. The method illustrated in FIG. 7 has a user drift-detection threshold that is distance-based. By way of example, if the totem 34 is more than 2 meters from the head unit 18, it is not possible for the user 10 to hold on to the totem 34 at such a distance and a drift is declared. If the user 10 can, for example, extend their arm by 0.5 meters, then the system will only declare a drift when the drift has reached an additional 1.5 meters. Such a large drift is undesirable. A system where drift is declared more quickly is more desirable.

Figure 8:
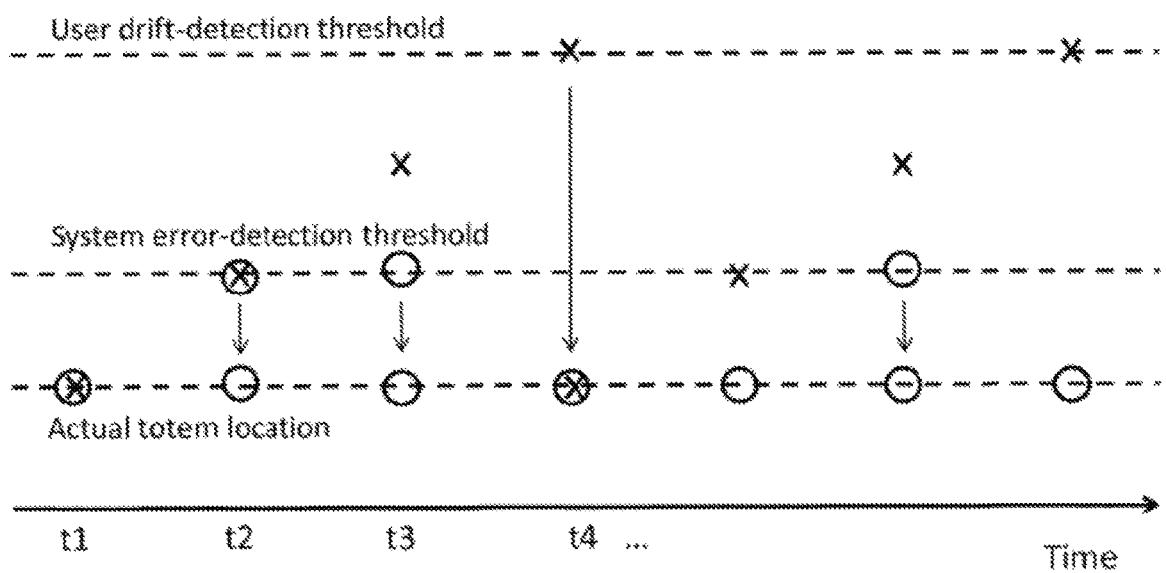
FIG. 8 is a graph illustrating how drift is corrected by detecting a difference between the fused location and an unfused location.

FIG. 8 illustrates the manner that the drift is declared according to the embodiment in FIG. 3. As noted with reference to FIG. 3, the unfused pose determination modeler 162 calculates the unfused pose 184 at a frequency of 240 Hz. As noted above, a drift may be declared if a difference between the fused pose 174 and the unfused location 184 is 100 mm or less as described above. At t1, the system-error detection threshold of, for example 100 mm, is reached and a drift is declared. At t2, the drift is immediately corrected. The drift can thus be corrected for smaller distance errors in the system in FIG. 8 than in the system of FIG. 7. Additionally, the drift may again be corrected at t3. Drift can thus be corrected more frequently in the system of FIG. 8 than in the system of FIG. 7.

Figure 9:
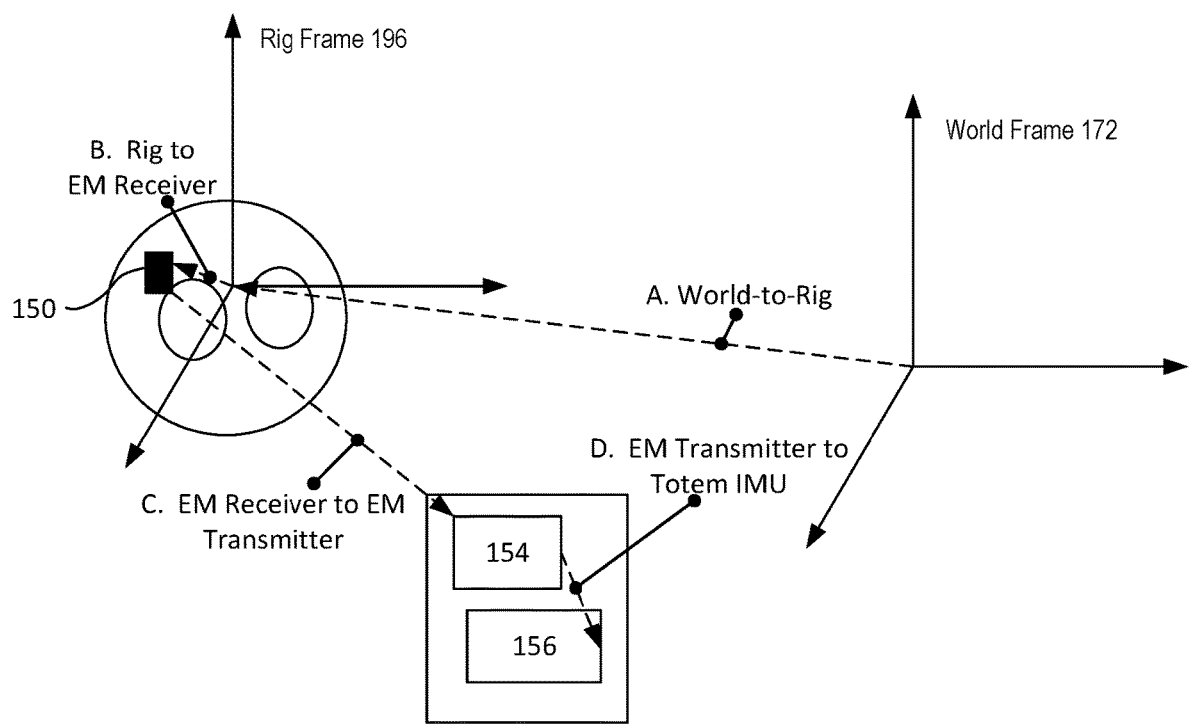
FIG. 9 is a perspective view illustrating how drift is corrected.

FIG. 9 shows how the drift is corrected. At A, a relationship is established between the world frame 172 and the rig frame 196. The rig frame 196 is not located in the same position as the EM receiver 150. Due to factory calibration, the location of the EM receiver 150 relative to the rig frame 196 is known. At B, an adjustment is made to calculate the rig frame 196 relative to the location of the EM receiver 150. At C, an estimation is made of the location of the EM receiver 150 relative to the EM transmitter 154. As noted above, such an estimation may be made using the SLAM system 48. Due to factory calibration, the location of the EM transmitter 154 is known relative to the location of the totem IMU 156. At D, an adjustment is made to determine the location of the totem IMU 156 relative to the EM transmitter 154. The calculations made at A, B, C and D thus establish the location of the totem IMU 156 in the world frame 172. The pose of the totem IMU 156 can then be reset based on the location of the totem IMU 156 in the world frame 172 as calculated.

Figure 10:
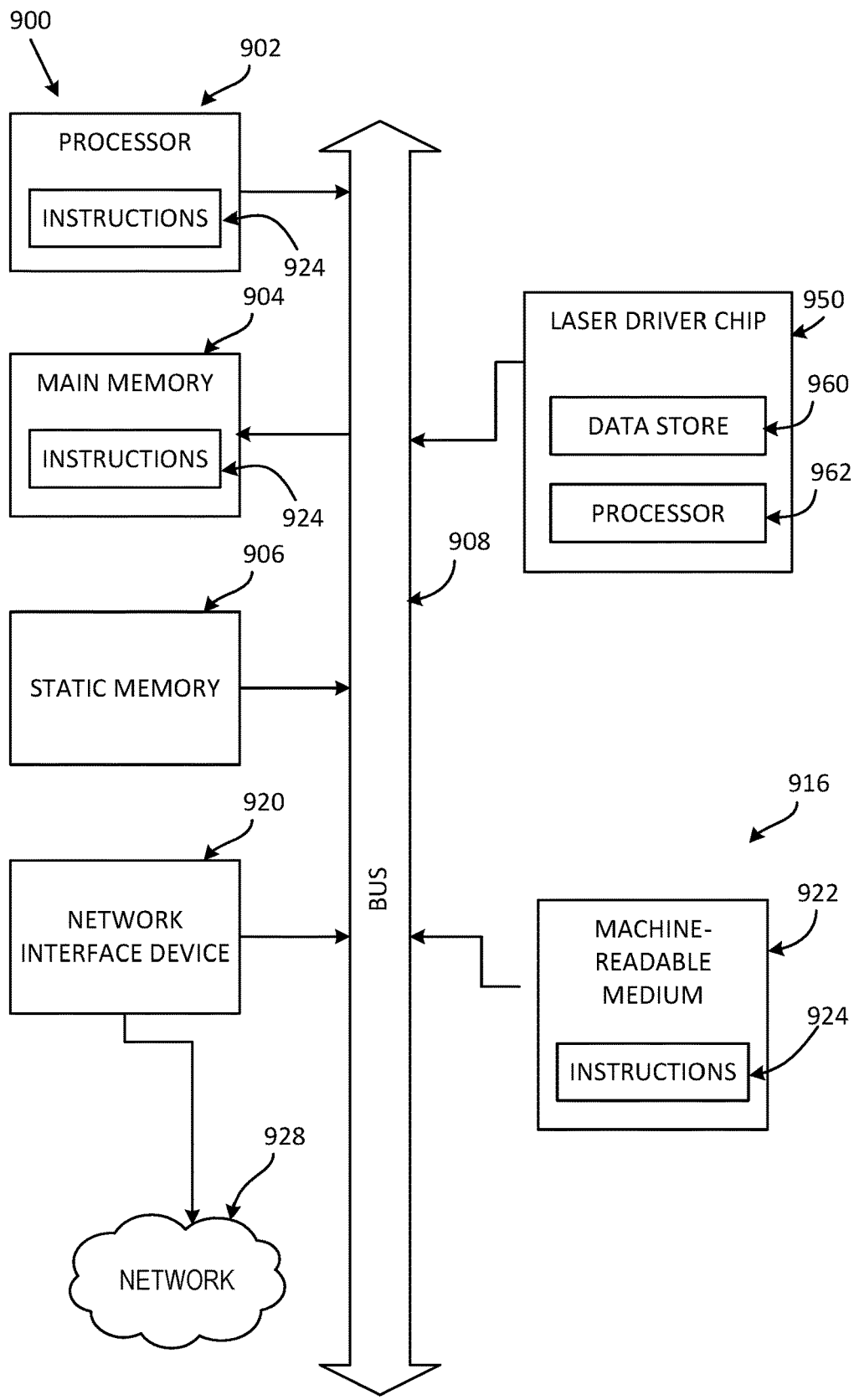
FIG. 10 is a block diagram of a machine in the form of a computer that can find application in the present invention system, in accordance with one embodiment of the invention.

FIG. 10 shows a diagrammatic representation of a machine in the exemplary form of a computer system 900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

The computer system 900 includes a laser driver chip 950 that is used to drive projectors to generate laser light. The laser driver chip 950 includes its own data store 960 and its own processor 962.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A user interaction method comprising:
   generating a totem inertial measurement unit (IMU) signal with a totem IMU on a totem body due to movement of the totem body;
   locating a head unit on a head of a user;
   storing a world frame;
   generating, with a processor, a first location of the totem in the world frame based on the totem IMU data;
   determining, with the processor, a second location of the totem relative to the world frame;
   resetting, with the processor, sensors of the totem IMU to match the second location;
   receiving, with the processor, image data from a data source; and
   displaying, with the processor, a virtual object using the image data to a user, a location of the virtual object being based on the first location of the totem.

2. The method of claim 1, further comprising:
   comparing, with the processor, the first location and the second location;
   declaring, with the processor, a drift only if the first location is more than a predetermined distance from the second location; and
   resetting, with the processor, sensors of the totem IMU to match the second location only if the drift is declared.

3. The method of claim 1, wherein a location of the totem relative to the head unit and a location of the head unit relative to the world frame are determined to establish a second location of the totem relative to the world frame.

4. The method of claim 1, further comprising:
providing, with the processor, a data stream to a display system that includes the virtual object positioned at the first location.

5. The method of claim 1, wherein the totem IMU reduces jitter of the virtual object.

6. The method of claim 1, wherein the totem IMU includes at least one of a gyroscope and an accelerometer.

7. The method of claim 1, further comprising:
transmitting an electromagnetic (EM) signal from an EM transmitter on the totem body;
receiving the EM signal with an EM receiver on the head unit body for the head unit, the EM wave being indicative of a location of the totem;
executing, with the processor, a fusion routine to generate the first location, which is a fused location of the totem in the world frame based on a combination of the EM wave with the totem IMU data; and
executing, with the processor, an unfused location determination modeler that determines a location of the totem relative to the head unit and a location of the head unit relative to the world frame to establish the second location, which is an unfused location of the totem relative to the world frame,
wherein a location of the virtual object is based on the fused location of the totem.

8. The method of claim 7, wherein the fusion routine executes at a first frequency and the unfused location determination modeler executes at a second frequency that is different from the first frequency.

9. The method of claim 7, wherein the EM receiver detects six-degrees of freedom ("6dof") movement of the EM transmitter relative to the EM receiver.

10. The method of claim 7, wherein the predetermined distance is less than 100 mm.

11. The method of claim 7, further comprising:
storing, with the processor, a rig frame, being a mathematical object located between eyepieces of the head unit to serve as the basis for defining where an object lies relative to the head unit;
taking, with the processor, a measurement to determine a rig frame pose, being the rig frame relative to the world frame;
deriving, with the processor, a receiver-to-world pose using known extrinsics as provided by factory-level calibration for the relationship between the EM receiver and the rig frame;
estimating, with the processor, an EM relationship between the EM receiver and EM transmitter to derive a transmitter-in-world pose; and
deriving, with the processor, a totem IMU-in-world pose as a non-fused pose using known extrinsics of the totem for the relationship between the EM transmitter and the totem IMU.

12. The method of claim 1, further comprising:
capturing an image of the totem with a camera on the head unit body; and
determining, with the processor, the unfused location based on the image of the totem.

13. The method of claim 1, wherein the virtual object is displayed using the display system that includes:
a transparent waveguide secured to the head unit body that permits light from the totem through to an eye of a user wearing the head unit body; and
a projector that converts that image data to light, the light from the projector entering into the waveguide at an entry pupil and leaving the waveguide at an exit pupil to the eye of the user.

14. The method of claim 1, further comprising:
detecting, with the processor, movement of the head unit;
calculating, with the processor, a placement value; and
modifying a position of the virtual object within a view of the user based on the placement value.

15. The method of claim 14, wherein a head unit IMU of the head unit detects movement of the head-mountable frame.

16. The method of claim 15, wherein the head unit IMU includes at least one of a gyroscope and an accelerometer.

17. The method of claim 14, further comprising:
detecting, with a head unit camera, movement of the head unit by taking images of objects within view of the head unit camera, the position of the virtual object being modified based on the pose position.

* * * * *